US012272870B2

(12) United States Patent
Kaeding et al.

(10) Patent No.: US 12,272,870 B2
(45) **Date of Patent: *Apr. 8, 2025**

(54) TUNABLE INTEGRATED MILLIMETER WAVE ANTENNA USING LASER ABLATION AND/OR FUSES

(71) Applicant: Micron Technology, Inc., Boise, ID (US)

(72) Inventors: John F. Kaeding, Boise, ID (US); Owen R. Fay, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/110,872

(22) Filed: Feb. 16, 2023

(65) Prior Publication Data

US 2023/0198139 A1 Jun. 22, 2023

Related U.S. Application Data

(62) Division of application No. 16/045,562, filed on Jul. 25, 2018, now Pat. No. 11,588,233.

(51) Int. Cl.
*H01Q 1/48* (2006.01)

(52) U.S. Cl.
CPC .................................... *H01Q 1/48* (2013.01)

(58) Field of Classification Search
CPC ........ H01Q 1/002; H01Q 1/2283; H01Q 1/36; H01Q 1/48; H01Q 9/045
See application file for complete search history.

(56) References Cited

U.S. PATENT DOCUMENTS

| | | | |
|---|---|---|---|
| 4,486,723 | A | 12/1984 | Lysobey |
| 4,780,724 | A | 10/1988 | Sharma et al. |
| 5,448,110 | A | 9/1995 | Tuttle et al. |
| 5,491,715 | A | 2/1996 | Flaxl |
| 5,572,226 | A | 11/1996 | Tuttle |
| 5,777,581 | A | 7/1998 | Lilly et al. |
| 5,970,398 | A | 10/1999 | Tuttle |
| 7,417,549 | B2 | 8/2008 | Cathey |
| 8,134,467 | B2 | 3/2012 | Cathey |
| 2004/0075607 | A1 | 4/2004 | Cathey |
| 2007/0222611 | A1 | 9/2007 | Cathey |

(Continued)

FOREIGN PATENT DOCUMENTS

| | | |
|---|---|---|
| CN | 101032054 A | 9/2007 |
| CN | 201548786 U | 8/2010 |

(Continued)

OTHER PUBLICATIONS

China National Intellectual Property Administration; Office Action for Application No. 201910677846.1 dated Nov. 4, 2020.

(Continued)

*Primary Examiner* — Hoang V Nguyen
(74) *Attorney, Agent, or Firm* — Perkins Coie LLP

(57) ABSTRACT

A method for tuning an antenna may include depositing multiple portions of an antenna structure onto a substrate. The method may further include electrically coupling each of the portions of the antenna structure. The method may also include severing an electrical connection between two of the portions of the antenna structure to tune the antenna structure for use with a transmission device.

9 Claims, 5 Drawing Sheets

(56) References Cited

U.S. PATENT DOCUMENTS

| | | | |
|---|---|---|---|
| 2008/0088510 | A1 | 4/2008 | Murata et al. |
| 2008/0211320 | A1 | 9/2008 | Cook et al. |
| 2009/0015414 | A1 | 1/2009 | Paone et al. |
| 2010/0109955 | A1 | 5/2010 | Anguera et al. |
| 2010/0123635 | A1 | 5/2010 | Lopez et al. |
| 2010/0134376 | A1 | 6/2010 | Margomenos et al. |
| 2010/0225539 | A1 | 9/2010 | Margomenos et al. |
| 2011/0134014 | A1 | 6/2011 | Kondo et al. |
| 2012/0299778 | A1 | 11/2012 | Yen et al. |
| 2016/0172740 | A1 | 6/2016 | Srirattana et al. |
| 2020/0036093 | A1 | 1/2020 | Kaeding et al. |

FOREIGN PATENT DOCUMENTS

| | | | | | |
|---|---|---|---|---|---|
| CN | 201608277 | U | | 10/2010 | |
| CN | 102054154 | A | | 5/2011 | |
| CN | 102651503 | A | | 8/2012 | |
| CN | 102713943 | A | | 10/2012 | |
| CN | 102800961 | A | | 11/2012 | |
| EP | 1633018 | A2 | * | 3/2006 | ............ H01Q 21/30 |
| JP | 200496341 | A | * | 3/2004 | ............ H01Q 13/08 |

OTHER PUBLICATIONS

CN Patent Application No. 201910677846.1—Chinese Office Action, dated Jun. 3, 2021, with English Translation, 16 pages.

CN Patent Application No. 201910677846.1—Chinese Office Action, dated Nov. 16, 2021, with English Translation, 21 pages.

CN Patent Application No. 201910677846.1—Chinese Office Action, dated Jul. 19, 2022, with English Translation, 19 pages.

CN Patent Application No. 201910677846.1—Chinese Reexamination Decision, mailed Nov. 16, 2022, with English Translation, 26 pages.

* cited by examiner

TUNABLE INTEGRATED MILLIMETER WAVE ANTENNA USING LASER ABLATION AND/OR FUSES

CROSS-REFERENCE TO RELATED APPLICATION(S)

This application is a division of U.S. patent application Ser. No. 16/045,562, filed Jul. 25, 2018, which is incorporated herein by reference in its entirety.

FIELD

The embodiments described herein relate to tuning integrated millimeter wave antennas using laser ablation and/or fuses.

BACKGROUND

As computing devices become more integrated into society, data access and mobility are becoming more important to a typical consumer. Compact wireless computing devices, such as cell phones, tablets, laptops, etc., are becoming faster, smaller, and more mobile. In order to meet the demands of new generation products, processing and memory packages within mobile devices must become faster and more compact. 5th Generation Wireless Systems (5G) provide high throughput, low latency, high mobility, and high connection density. Making use of millimeter wave bands (24-86 GHz) for mobile data communication is beneficial for producing 5G systems.

Antennas used for millimeter wave communication typically include an antenna array that spans an area specific to the design of transmission circuitry to be used. As such, typical components (e.g., printed circuit boards, integrated circuits, etc.) that incorporate antennas for millimeter wave communication may be specially produced to be compatible with a selected transmitter or application processor. In order to achieve compatibility with multiple processors, multiple antenna designs may be produced. This may add to the cost of production and may complicate incorporating millimeter wave antennas into multiple types and designs of mobile devices. Other disadvantages may exist.

Figure 1:
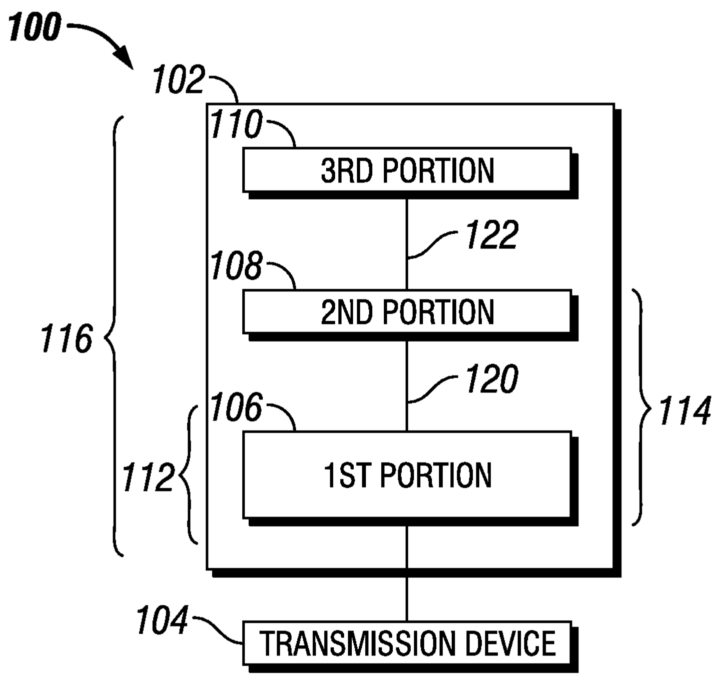
FIG. 1 is a block diagram of an embodiment of a semiconductor device assembly.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

In this disclosure, numerous specific details are discussed to provide a thorough and enabling description for embodiments of the present disclosure. One of ordinary skill in the art will recognize that the disclosure can be practiced without one or more of the specific details. Well-known structures and/or operations often associated with semiconductor devices may not be shown and/or may not be described in detail to avoid obscuring other aspects of the disclosure. In general, it should be understood that various other devices, systems, and/or methods in addition to those specific embodiments disclosed herein may be within the scope of the present disclosure.

The term "semiconductor device assembly" can refer to an assembly of one or more semiconductor devices, semiconductor device packages, and/or substrates, which may include interposers, supports, and/or other suitable substrates. The semiconductor device assembly may be manufactured as, but not limited to, discrete package form, strip or matrix form, and/or wafer panel form. The term "semiconductor device" generally refers to a solid-state device that includes semiconductor material. A semiconductor device can include, for example, a semiconductor substrate, wafer, panel, or a single die from a wafer or substrate. A semiconductor device may further include one or more device layers deposited on a substrate. A semiconductor device may refer herein to a semiconductor die, but semiconductor devices are not limited to semiconductor dies.

The term "semiconductor device package" can refer to an arrangement with one or more semiconductor devices incorporated into a common package. A semiconductor package can include a housing or casing that partially or completely encapsulates at least one semiconductor device. A semiconductor package can also include a substrate that carries one or more semiconductor devices. The substrate may be attached to or otherwise incorporate within the housing or casing.

As used herein, the terms "vertical," "lateral," "upper," and "lower" can refer to relative directions or positions of features in the semiconductor devices and/or semiconductor device assemblies shown in the Figures. For example, "upper" or "uppermost" can refer to a feature positioned closer to the top of a page than another feature. These terms, however, should be construed broadly to include semiconductor devices and/or semiconductor device assemblies having other orientations, such as inverted or inclined orientations where top/bottom, over/under, above/below, up/down, and left/right can be interchanged depending on the orientation.

Various embodiments of this disclosure are directed to semiconductor devices, semiconductor device assemblies, semiconductor packages, and methods of making and/or operating semiconductor devices. In one embodiment of the disclosure a method includes depositing multiple portions of an antenna structure onto a substrate. The method further includes electrically coupling each of the portions of the antenna structure in series. The method also includes severing an electrical connection between two of the portions of the antenna structure to tune the antenna structure for use with a transmission device. In some embodiments, severing the electrical connection includes performing a laser ablation process. In some embodiments, severing the electrical connection comprises performing a fuse blowing process. The method may further include forming a first semiconductor package that includes the substrate and coupling a second semiconductor package to the first semiconductor package, the second semiconductor package including the transmission device.

In another embodiment, a method includes depositing a first portion and a second portion of an antenna structure onto a substrate. The method further includes electrically coupling the first portion of the antenna structure to the second portion of the antenna structure, where the first portion of the antenna structure defines an antenna that is compatible with a first transmission device, and where the first portion of the antenna structure and the second portion of the antenna structure, together, define an antenna that is compatible with a second transmission device. The method may further include electrically coupling the first portion of the antenna structure to the first transmission device, and electrically decoupling the first portion of the antenna structure from the second portion of the antenna structure. Alternatively, the method may include electrically coupling the second transmission device to the first portion of the antenna structure, while refraining from decoupling the first portion of the antenna structure from the second portion of the antenna structure.

Referring to FIG. 1, a block diagram of an embodiment of a semiconductor device assembly 100 is depicted. The semiconductor device assembly 100 may include a substrate 102. The substrate 102 may be a semiconductor substrate and, although not depicted in FIG. 1, may include additional devices formed thereon. For example, the substrate 102 may correspond to a memory chip configured to be coupled to another semiconductor device (e.g., in a package-on-package configuration or another type of stacked integrated circuit configuration). The substrate 102 may also correspond to other types of semiconductor devices.

A first portion 106, second portion 108, and third portion 110 of an antenna structure may be formed on the substrate 102. The first portion 106, second portion 108, and third portion 110 may be coupled together by electrical connection circuits 120, 122. The first portion 106 of the antenna structure may correspond to an antenna 112 that is compatible with a first type of transmission device. The first portion 106 and the second portion 108, when electrically coupled together by the electrical connection circuit 120, may correspond to an antenna 114 that is compatible with a second type of transmission device. The first portion 106, second portion 108, and third portion 110 of the antenna structure, when electrically coupled together by the electrical connection circuits 120, 122, may correspond to an antenna 116 that is compatible with a third type of transmission device.

The antenna structure made up by the portions 106, 108, 110 may be a millimeter wave antenna and may be usable for a 5G communications system. Further, the antenna structure may be integrated into a semiconductor device or a semiconductor package. Although FIG. 1 only depicts three portions 106, 108, 110 of the antenna structure, more or fewer than three portions may be formed on the substrate 102 and may be electrically coupled, as would be understood by persons of ordinary skill in the art having the benefit of this disclosure.

A transmission device 104 may be coupled to at least the first portion 106 of the antenna structure. The transmission device 104 may be compatible with an antenna having a particular area. In order to tune the antenna structure for use with the transmission device 104, one or more of the connections 120, 122 may be severed. For example, in some cases the electrical connection circuits 120, 122 may include fuses or laser ablation zones, as described herein.

To illustrate, if the transmission device 104 is compatible with the antenna 112, then the electrical connection circuit 120 may be severed to make the antenna structure compatible with the transmission device 104. If the transmission device 104 is compatible with the antenna 114, then the electrical connection circuit 122 may be severed to make the antenna structure compatible with the transmission device 104. If the transmission device 104 is compatible with the antenna 116, then each of the electrical connection circuits 120, 122 may remain intact to make the antenna structure compatible with the transmission device 104.

The transmission device 104 may include radio communication circuitry, such as a transmitter, receiver, or a transceiver. Although not depicted in FIG. 1, the transmission device 104 may be included within a semiconductor device that may be coupled to the substrate 102 in a stacked semiconductor device assembly configuration (e.g., in a package-on-package configuration or another type of stacked integrated circuit configuration). For example, the transmission device 104 may be included in a semiconductor package that includes a processor (e.g., an applications processor, a digital signal processor, a central processing unit, etc.). The portions 106, 108, 110 of the antenna structure may be included in another semiconductor package that includes a memory module. The memory may be stacked with the processor to form a package-on-package assembly, or another type of stacked integrated circuit.

A benefit of the semiconductor device assembly 100 is that an antenna structure may be tuned depending on a particular type of transmission device 104 to be used with it. This may enable a single design for a particular device (e.g., a semiconductor package) to be manufactured and used with multiple different designs for a transmission device 104. As such, the costs of manufacturing the substrate 102 including the portions 106, 108, 110 of the antenna structure may be reduced by not customizing each design for a contemplated transmission device 104. Other advantages may exist.

Figure 2:
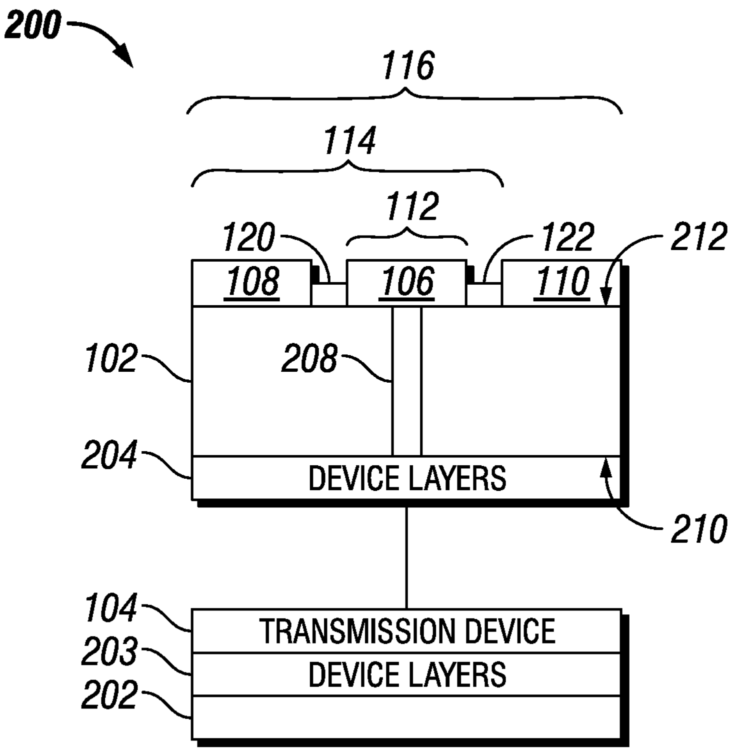
FIG. 2 is a schematic diagram of an embodiment of a semiconductor device assembly.

Referring to FIG. 2, a semiconductor layer diagram of an embodiment of a semiconductor device assembly 200 is depicted. The assembly 200 may include a substrate 102 and a first portion 106, a second portion 108, and a third portion 110 of an antenna structure formed on the substrate 102. The first portion 106 of the antenna structure may correspond to an antenna 112. The first portion 106 and the second portion 108 of the antenna structure may correspond to a second antenna 114. The first portion 106, second portion 108, and the third portion 110, together, may correspond to a third antenna 116. The portions 106, 108, 110 may be coupled together by electrical connection circuits 120, 122. The assembly 200 may correspond to the assembly 100.

The assembly 200 may include a second substrate 202. The transmission device 104 may be formed on the second substrate 202. The substrate 102 and the second substrate 202 may be electrically coupled together in a stacked chip configuration. The second substrate 202 may also include one or more device layers 203. The one or more device layers 203 may correspond to a processor, or another type of integrated circuit. The transmission device 104 may be incorporated into the device layers 203 formed on the second substrate 202.

One or more device layers 204 may be formed on a first surface 210 of the substrate 102. The device layers 204 may correspond to a memory device usable with the device layers 203. For example, the substrate 102 may correspond to a first semiconductor package and the second substrate 202 may correspond to a second semiconductor package. The packages may be electrically coupled in a stack configuration. The portions 106, 108, 110 of the antenna structure may be formed on a second surface 212 of the substrate 102. A via 208 may join the first portion 106 of the antenna to the device layers 204. Alternatively, the via 208 may join the first portion 106 of the antenna structure to the transmission device 104, bypassing the device layers 204. The via 208 may be a through-silicon-via and may enable communication between the transmission device 104 and the first portion 106 of the antenna.

A benefit of the assembly 200 is that the portions 106, 108, 110 of the antenna structure may be formed on a backside of the substrate 102 while still enabling the tunable antenna to communicate with the transmission device 104. Other advantages may exist.

Figure 3:
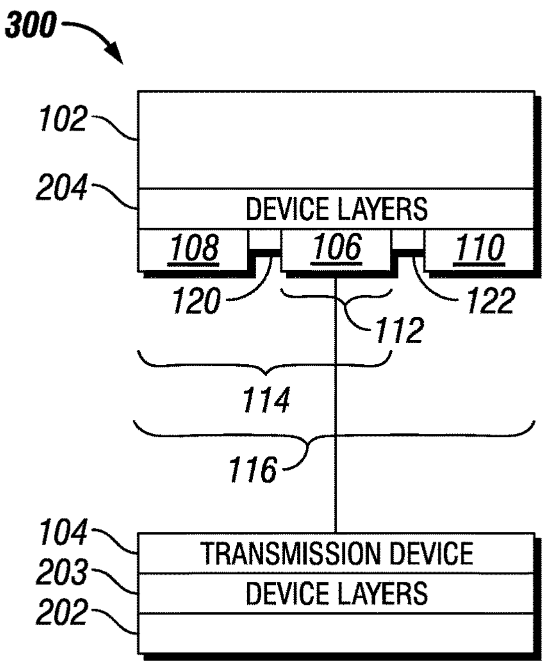
FIG. 3 is a schematic diagram of an embodiment of a semiconductor device assembly.

Referring to FIG. 3, a semiconductor layer diagram of an embodiment of a semiconductor device assembly 300 is depicted. The assembly 300 may include a substrate 102 and a first portion 106, a second portion 108, and a third portion 110 of an antenna structure formed on the substrate 102. The first portion 106 of the antenna structure may correspond to an antenna 112. The first portion 106 and the second portion 108 of the antenna structure may correspond to a second antenna 114. The first portion 106, second portion 108, and the third portion 110, together, may correspond to a third antenna 116. The portions 106, 108, 110 may be coupled together by electrical connection circuits 120, 122. The assembly 300 may correspond to the assembly 100.

The assembly 300 may include a second substrate 202. The transmission device 104 may be formed on the second substrate 202. The substrate 102 and the second substrate 202 may be electrically coupled together in a stacked chip configuration. The second substrate 202 may also include one or more device layers 203. The one or more device layers 203 may correspond to a processor, or another type of integrated circuit. The transmission device 104 may be incorporated into the device layers 203 formed on the second substrate 202.

One or more device layers 204 may be formed on the substrate 102. The portions 106, 108, 110 of the antenna structure may be formed on the same surface of the substrate 102 as the device layers 204. For example, in some embodiments, the portions 106, 108, 110 of the antenna structure may be formed in a metal layer of the device layers 204.

A benefit of the assembly 300 is that the transmission device 104 may be coupled to the first portion 106 of the antenna structure without passing through a substrate. Other advantages may exist. Further, as depicted in FIGS. 2 and 3, the portions 106, 108, 110 of the antenna structure may have a different topology as compared with FIG. 1. For example, in FIGS. 2 and 3, portion 106 may be a middle portion with the portions 108 and 110 branching out therefrom, while in FIG. 1, the portions 106, 108, 110 may be coupled in series. The topology of FIGS. 2 and 3 may enable a combination of the portion 106 and the portion 110 to form an antenna without the portion 108 intervening. In contrast, the topology of FIG. 1 may enable a linear combination of the portions 106, 108, 110. Other topologies are possible. The specific topology of the antenna structure may depend on an intended application.

Figure 4A:
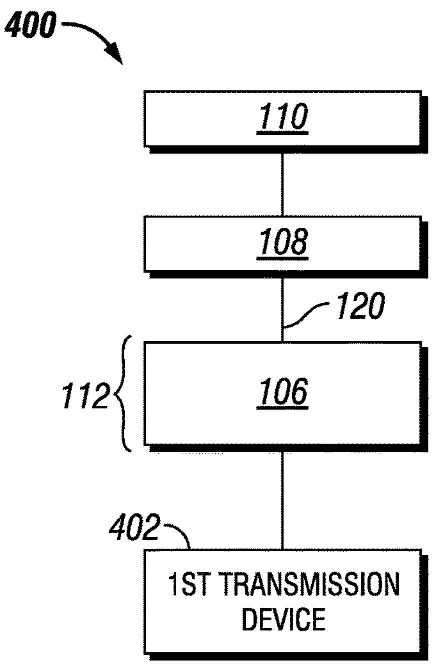
FIGS. 4A-4C depict an embodiment of a system for tuning an antenna.
Figure 4B:
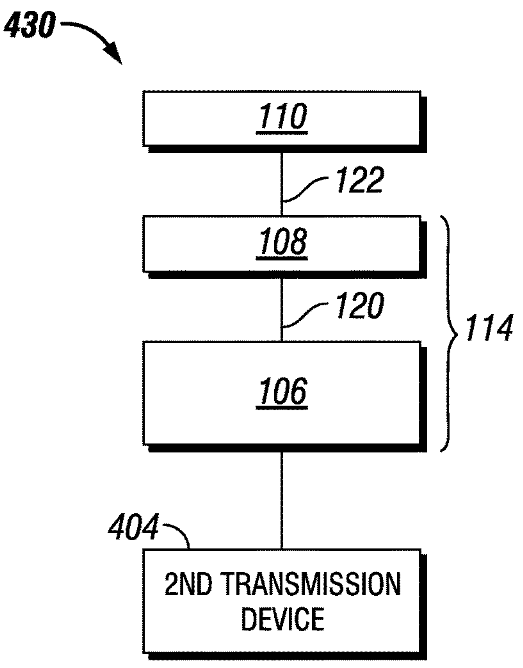
Figure 4C:
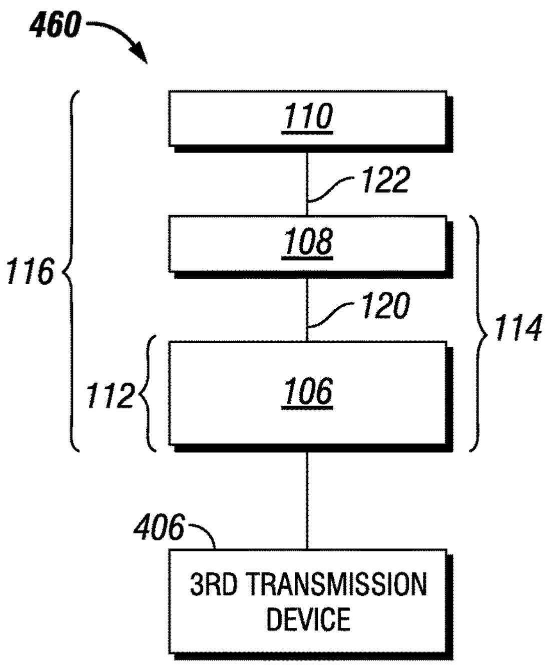

As explained herein, an antenna structure may be tuned for a particular transmission device by severing a connection between portions of the antenna structure. This concept is illustrated in FIGS. 4A-4C. Referring to FIG. 4A, a system 400 is depicted. The system 400 includes a first transmission device 402. The first transmission device 402 may be compatible with an antenna 112 that includes a first portion 106 of an antenna structure, but excludes a second portion 108 and a third portion 110. In order to tune the antenna structure to be compatible with the first transmission device 402, an electrical connection circuit 120 may be severed between the first portion 106 and the second portion 108.

Referring to FIG. 4B, a system 430 is depicted. The system 430 may include a second transmission device 404. The second transmission device 404 may be compatible with an antenna 114 that includes a first portion 106 and a second portion 108 of an antenna structure, but excludes a third portion 110 of the antenna structure. In order to tune the antenna structure to be compatible with the second transmission device 404, an electrical connection circuit 122 may be severed between the second portion 108 and the third portion 110.

Referring to FIG. 4C, a system 460 is depicted. The system 460 may include a third transmission device 406. The third transmission device 406 may be compatible with an antenna 116 that includes a first portion 106, a second portion 108, and a third portion 110 of an antenna structure. In the example in FIG. 4C, the antenna structure does not need to be tuned to be compatible with the third transmission device 406.

Although the antenna structures of FIGS. 4A-4B include three portions, more or fewer than three portions may be used in order to make the antenna compatible with more or fewer than three different types of transmission devices.

Figure 5:
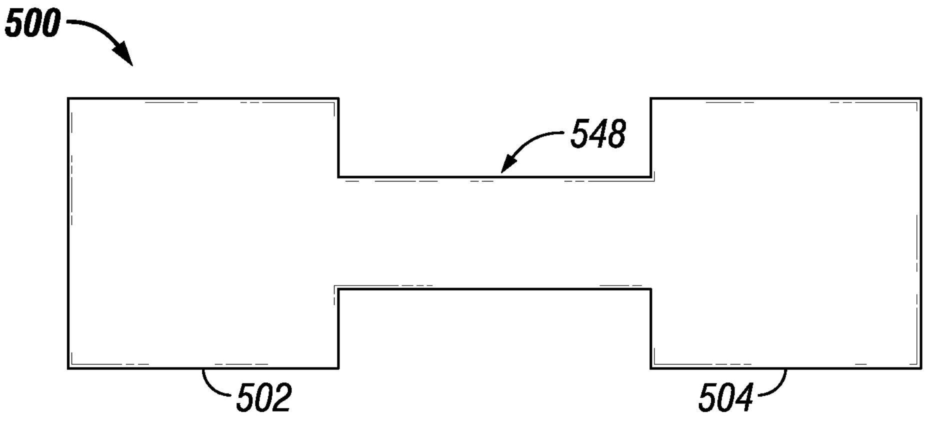
FIG. 5 depicts an embodiment of an electrical connection circuit with a laser ablation portion.

Referring to FIG. 5, an embodiment of an electrical connection circuit 500 with a laser ablation portion 548 is depicted. The laser ablation portion may be an electrical runner that is susceptible to laser ablation. The electrical connection circuit 500 may correspond to the electrical connection circuits 120, 122 and may be used with the semiconductor device assemblies 100, 200, 300 and/or the systems 400, 430, 460.

The electrical connection circuit 500 may include a first electrode 502 and a second electrode 504. Each of the first electrode 502 and the second electrode 504 may be configured to be electrically coupled to a corresponding portion of an antenna, such as the portions 106, 108, 110. A laser ablation portion 548 may be exposed on a surface (e.g., on a top surface of the assemblies 100, 200, 300). By exposing the laser ablation portion 548, a laser may be used to remove the laser ablation portion 548, thereby severing the electrical connection circuit 500 between the first electrode 502 and the second electrode 504. This may enable an antenna structure to be shortened, thereby decreasing the area of the antenna structure. Different types of radio circuitry may require antennas of different sizes. The circuit 500 may further enable a shape of an antenna structure to be altered in order to be compatible with different types of radio circuitry. By including a laser ablation portion 548, an antenna structure may be tuned for a particular application. As such, the design of a semiconductor device may not need to be changed or customized for use with different lower chips in a stack.

Figure 6:
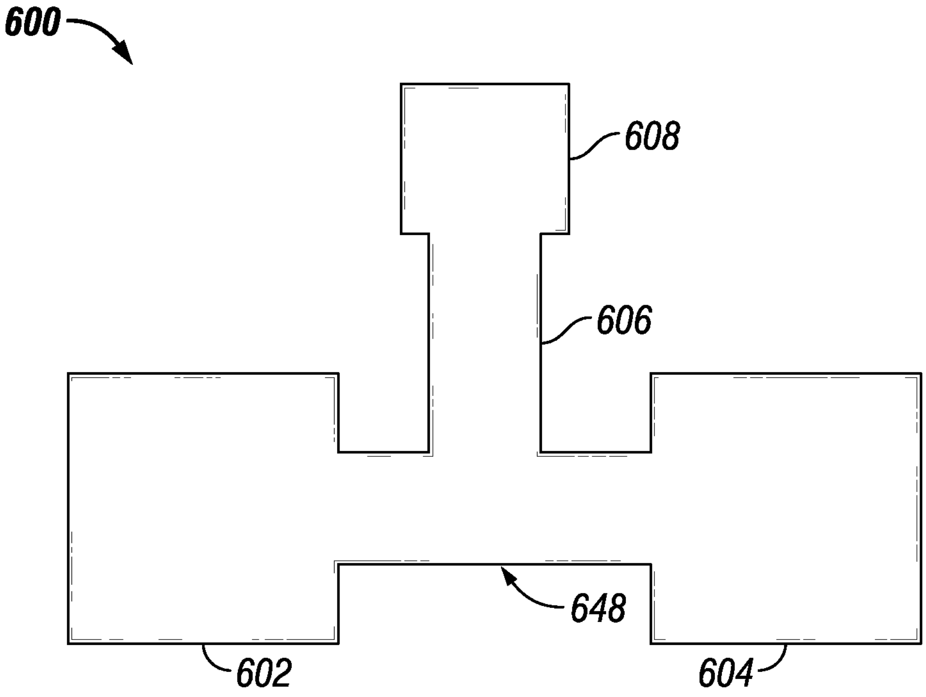
FIG. 6 depicts an embodiment of an electrical connection circuit with a fuse.

Referring to FIG. 6, an embodiment of an electrical connection circuit 600 with a fuse 648 is depicted. The electrical connection circuit 600 may correspond to the electrical connection circuits 120, 122 and may be used with the semiconductor device assemblies 100, 200, 300 and/or the systems 400, 430, 460.

The electrical connection circuit 600 may include a first electrode 602 and a second electrode 604 connected by a fuse 648. Each of the first electrode 602 and the second electrode 604 may be configured to be electrically coupled to a corresponding portion of an antenna, such as the portions 106, 108, 110. The electrical connection circuit 600 may further include a pin 608 and a connector 606. By applying a current to the pin 608, the fuse 648 may be blown and the first electrode 602 may be disconnected from the second electrode 604. The connector 606 may be robust enough to limit breakdown only to the fuse 648, thereby ensuring that an electrical connection between the first electrode 602 and the second electrode 604 is severed.

Blowing the fuse 648 may enable an antenna structure to be shortened as described herein, thereby decreasing an area associated with the antenna structure. Different types of radio circuitry may require antennas of different sizes. By including the fuse 648, the antenna structure may be tuned for a particular application.

Figure 7:
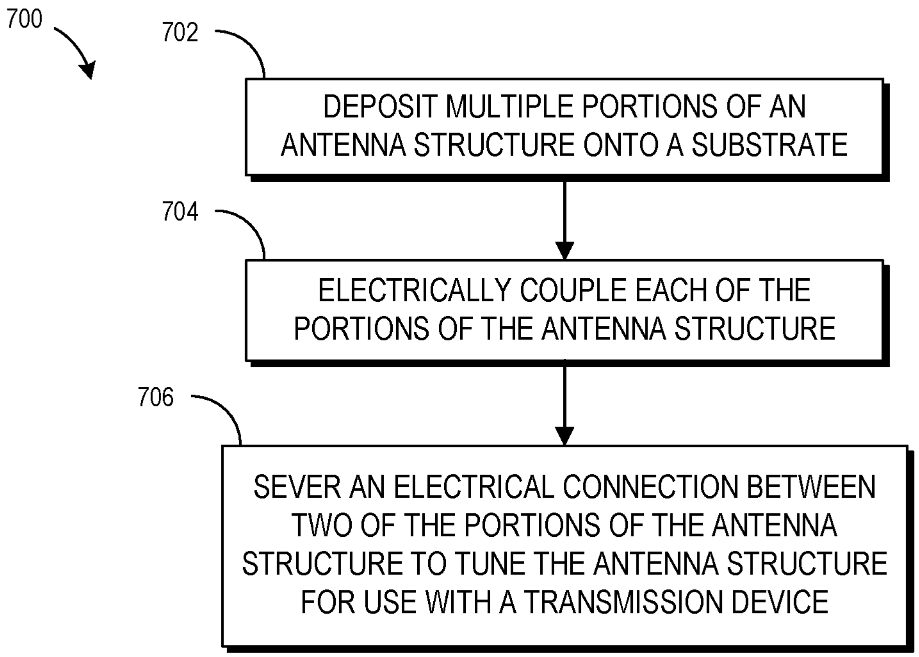
FIG. 7 is a flow chart depicting an embodiment of a method for tuning an antenna.

Referring to FIG. 7, an embodiment of a method 700 for tuning an antenna is depicted. The method 700 may include depositing multiple portions of an antenna structure onto a substrate, at 702. For example, the portions 106, 108, 110 of an antenna structure may be deposited on the substrate 102.

The method 700 may further include electrically coupling each of the portions of the antenna structure in series, at 704. For example, the portions 106, 108, 110 may be coupled by the electrical connection circuits 120, 122.

The method 700 may also include severing an electrical connection between two of the portions of the antenna structure to tune the antenna structure for use with a transmission device, at 706. For example, one of the electrical connection circuits 120, 122 may be severed for use with the transmission device 104.

Figure 8:
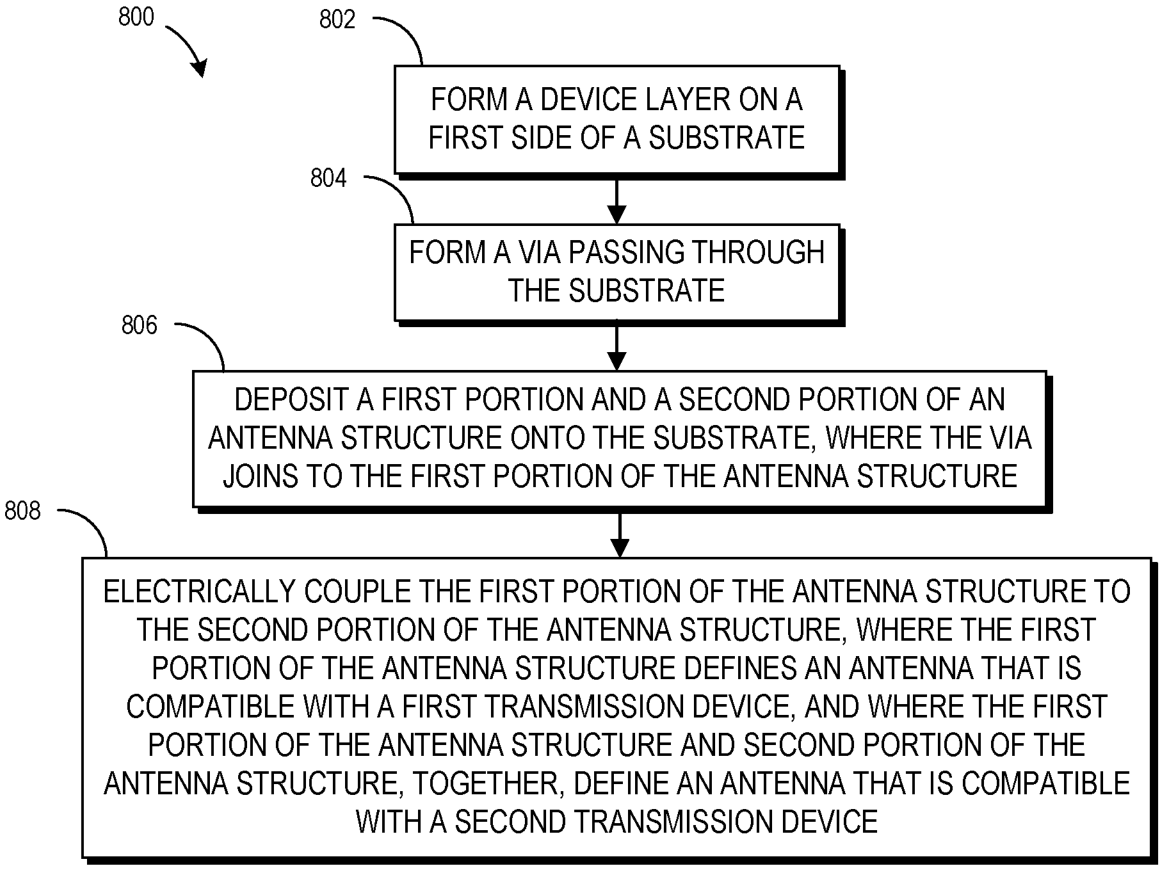
FIG. 8 is a flow chart depicting an embodiment of a method for tuning an antenna.

Referring to FIG. 8, a method 800 for tuning an antenna is depicted. The method 800 may include forming a device layer on a first side of a substrate, at 802. The method 800 may include forming a via passing through the substrate, at 804. The method 800 may include depositing a first portion and a second portion of an antenna structure onto a substrate, at 806. For example, the first portion 106 and the second portion 108 of the antenna structure may be deposited on the substrate 102.

The method 800 may also include electrically coupling the first portion of the antenna structure to the second portion of the antenna structure, where the first portion of the antenna structure defines an antenna that is compatible with a first transmission device, and where the first portion of the antenna structure and the second portion of the antenna structure, together, define an antenna that is compatible with a second transmission device, at 808. For example, the first portion 106 may be coupled to the second portion 108 by the electrical connection circuit 120.

In some embodiments, an antenna structure may be formed through an additive process. For example, referring to FIG. 1, instead of severing one or both of the electrical connections 120, 122, a method may be performed in which one or both of the electrical connections 120, 122 are formed to tune the antenna structure. To illustrate, an anti-fuse may be used to couple the first portion 106 to the second portion 108, or to couple the second portion 108 to the third portion 110.

Referring to FIG. 8, electrically coupling the first portion of the antenna structure to the second portion of the antenna structure may be performed by "blowing" an anti-fuse between the first portion and the second portion. In this case, the antenna structure may be tuned to correspond to the second transmission device. Alternatively, the method 800 may be performed before tuning and the antenna structure may be tuned through subtractive methods, as described with reference to FIGS. 9 and 10.

Figure 9:
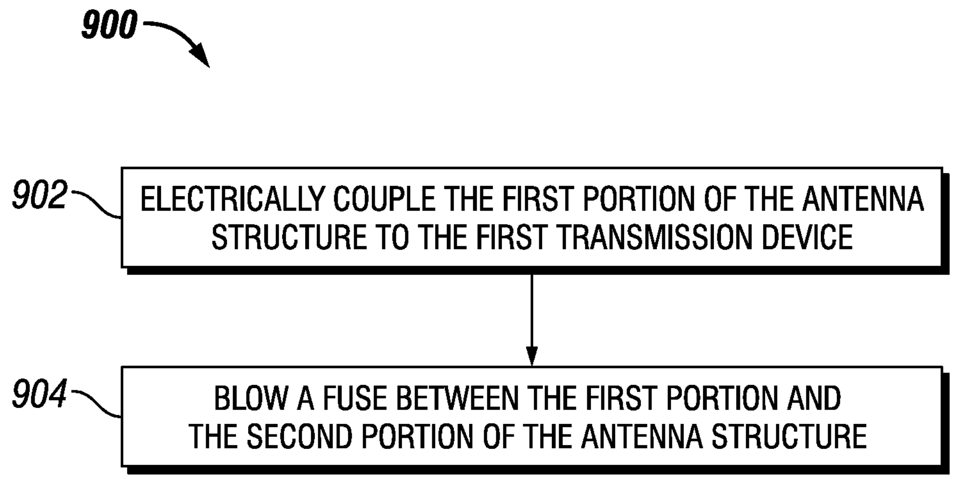
FIG. 9 is a flow chart depicting an embodiment of a method for tuning an antenna.

Referring to FIG. 9, a method 900 for tuning an antenna is depicted. The method 900 may be a continuation of the method 800, or may be practiced independently, as would be understood by persons of ordinary skill in the art, having the benefit of this disclosure. The method 900 may include electrically coupling the first portion of the antenna structure to the first transmission device, at 902. For example, the transmission device 104 may be coupled to the first portion 106 of the antenna structure.

The method 900 may further include blowing a fuse between the first portion and the second portion of the antenna structure, at 904. For example, the fuse 648 may correspond to the electrical connection circuit 120 and may be blown to electrically decouple the first portion 106 from the second portion 108.

Figure 10:
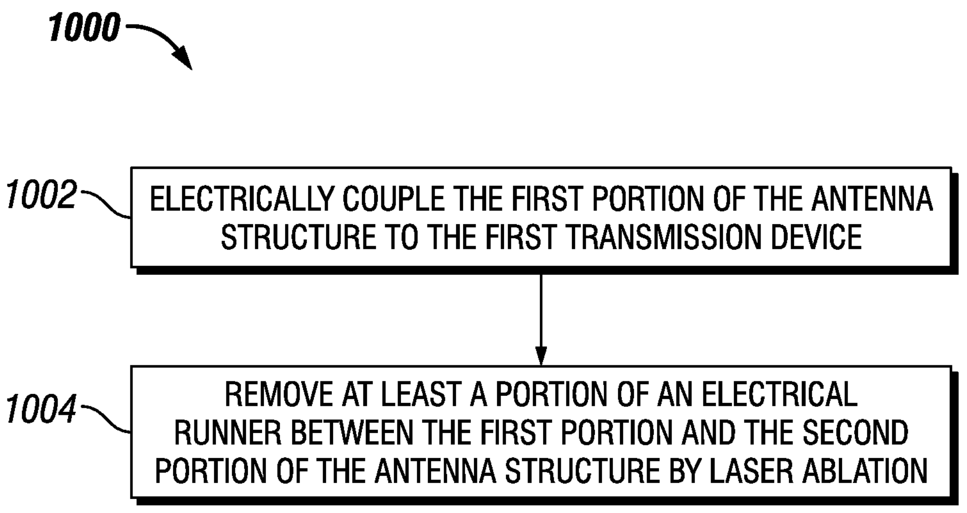
FIG. 10 is a flow chart depicting an embodiment of a method for tuning an antenna.

Referring to FIG. 10, a method 1000 for tuning an antenna is depicted. The method 1000 may be a continuation of the method 800, or may be practiced independently, as would be understood by persons of ordinary skill in the art, having the benefit of this disclosure. The method 1000 may include electrically coupling the first portion of the antenna structure to the first transmission device, at 1002. For example, the transmission device 104 may be coupled to the first portion 106 of the antenna structure.

The method 1000 may further include removing at least a portion of an electrical runner between the first portion and the second portion of the antenna structure by laser ablation, at 1004. For example, the laser ablation portion 548 may correspond to the electrical connection circuit 120 and may be removed by laser ablation to electrically decouple the first portion 106 from the second portion 108.

Although this disclosure has been described in terms of certain embodiments, other embodiments that are apparent to those of ordinary skill in the art, including embodiments that do not provide all of the features and advantages set forth herein, are also within the scope of this disclosure. The disclosure may encompass other embodiments not expressly shown or described herein. Accordingly, the scope of the present disclosure is defined only by reference to the appended claims and equivalents thereof.

What is claimed is:

1. A method comprising:

forming a device layer on a first side of a semiconductor substrate;

forming a through-silicon-via (TSV) passing through the semiconductor substrate;

depositing a first portion and a second portion of an antenna structure onto a second side of the semiconductor substrate opposite the first side, wherein the TSV joins to the first portion of the antenna structure;

electrically coupling the first portion and the second portion of the antenna structure; and severing an electrical connection between two of the portions of the antenna structure to tune the antenna structure for use with a transmission device.

2. The method of claim 1, wherein severing the electrical connection comprises performing a laser ablation process.

3. The method of claim 1, wherein severing the electrical connection comprises performing a fuse blowing process.

4. The method of claim 1, further comprising:

forming a first semiconductor package that includes the semiconductor substrate; and coupling a second semiconductor package to the first semiconductor package, the second semiconductor package including the transmission device.

5. A semiconductor device assembly comprising:

a semiconductor substrate including a through-silicon via (TSV) passing through the semiconductor substrate and a first side on which is formed a device layer;

a first portion of an antenna structure formed on a second side of the semiconductor substrate opposite the first side, wherein the TSV joins to the first portion of the antenna structure;

a second portion of the antenna structure formed on the second side of the semiconductor substrate; and an electrical connection circuit between the first portion of the antenna structure and the second portion of the antenna structure, wherein the first portion of the antenna structure, when uncoupled from the second portion of the antenna structure, defines a first antenna that is compatible with a first transmission device having a first design, and wherein the first portion of the antenna structure and the second portion of the antenna structure, when coupled together, define a second antenna that is compatible with a second transmission device having a second design different than the first design.

6. The semiconductor device assembly of claim 5, wherein the electrical connection circuit includes a fuse.

7. The semiconductor device assembly of claim 6, further comprising a pin electrically coupled to the fuse.

8. The semiconductor device assembly of claim 5, wherein the electrical connection circuit includes an electrical runner, the electrical runner susceptible to removal by laser ablation.

9. The semiconductor device assembly of claim 5, further comprising:

one or more additional portions of the antenna structure formed on the semiconductor substrate; and one or more additional electrical connection circuits electrically connecting the one or more additional portions of the antenna structure with the first portion and the second portion.

* * * * *